Sept. 15, 1959  F. K. FORMIS  2,904,089
EGG OPENER
Filed Dec. 10, 1956

INVENTOR
Frederick K. Formis
BY
ATTORNEY

2,904,089
EGG OPENER

Frederick K. Formis, Chattanooga, Tenn.

Application December 10, 1956, Serial No. 627,323

3 Claims. (Cl. 146—2)

This invention relates to an improvement in egg openers and deals particularly with an apparatus useful in opening eggs.

Various types of egg opening devices have been produced. In general, certain of these include an egg holding member which supports a slidable knife blade. When the egg is to be opened, this blade is moved in a manner to sever the end of the egg from the remainder. Unfortunately, however, most such devices relied upon the skill of the operator to provide a clean, sharply defined line of separation. It is a well known fact that if a soft boiled or raw egg is opened with an instrument such as a kitchen knife, the effectiveness of the operation depends largely upon the velocity of the blade during the operation. If the blade moves slowly, the shell is cracked over a wide area and the contents drain onto the fingers holding the egg. A sharp, quick blow of the blade will cut cleanly through the egg with but slight shattering of the shell. Previous egg opening devices constructed similarly require some skill to operate. It is an object of the present invention to produce a device which functions effectively for its intended purpose and which does not have the previous difficulties encountered in such devices.

An object of the present invention lies in the provision of an egg opener which requires no practice to operate, and incorporates a blade which cannot be operated at a speed insufficient to cleanly sever the end of the egg from the body. The blade is held in an inoperative position until a substantial force is applied to move the blade. This force is sufficient to supply the needed velocity to the blade to cleanly cut the egg once the blade is released.

A feature of the present invention lies in the provision of an egg handling device preferably comprising an elongated strip of flexible resilient material such as spring metal bent intermediate its ends to provide a pair of normally diverging arms. These arms are provided with egg receiving apertures near the free ends thereof, the apertures in the arms being in opposed relation and being smaller in diameter than the diameter of the egg or eggs with which it is used. The arms are preferably provided with side flanges so as to stiffen the arms and make them relatively inflexible between the free ends of the arm and the connecting bend between the arms. An egg may be gripped between the arms, portions of the egg extending through the egg receiving openings so that the egg is firmly supported.

A feature of the present invention resides in the provision of a lock for holding the arms in an adjusted relation. In preferred form this lock comprises a strip of metal cut from the body of one of the arms and extending through an aperture in the other of the arms. This strip is provided with spaced teeth on its surface which engage a portion of the arm adjoining the aperture through which the strip extends. The strip thus forms a locking arm which is resiliently urged toward locking position but which may be easily bent out of locking position when it is desired to release the egg.

A further feature of the present invention resides in the provision of a knife blade which is slidably supported on one of the arms and which is movable over the aperture in the associated arm to cut off the projecting portion of the egg. In the particular arrangement illustrated, the blade is provided with a central point designed to first penetrate the shell of the egg and laterally extending blade portions on either side of the point designed to cut the entire end of the egg from the remainder of the egg body.

A further feature of the present invention resides in the manner in which the blade is actuated. The blade includes a resilient detent latch which engages into a notch or hole in the arm on which the blade is mounted. A blade pushing shoulder is provided at the rear end of the blade by means of which the blade may be moved. The detent latch engages in the opening or aperture in the blade supporting arm until a considerable force is exerted upon the blade moving shoulder. When sufficient force is exerted, the detent latch suddenly disengages from the opening in the blade supporting arm and the blade is released for movement into egg cutting position. The force which has been exerted upon the blade moving shoulder or handle is sufficient to move the blade quickly through the top of the egg, severing the entire top from the bottom thereof.

These and other objects and novel features of the present invention will be more clearly and fully set forth in the following specification and claims.

In the drawings forming a part of the specification:

Figure 1:
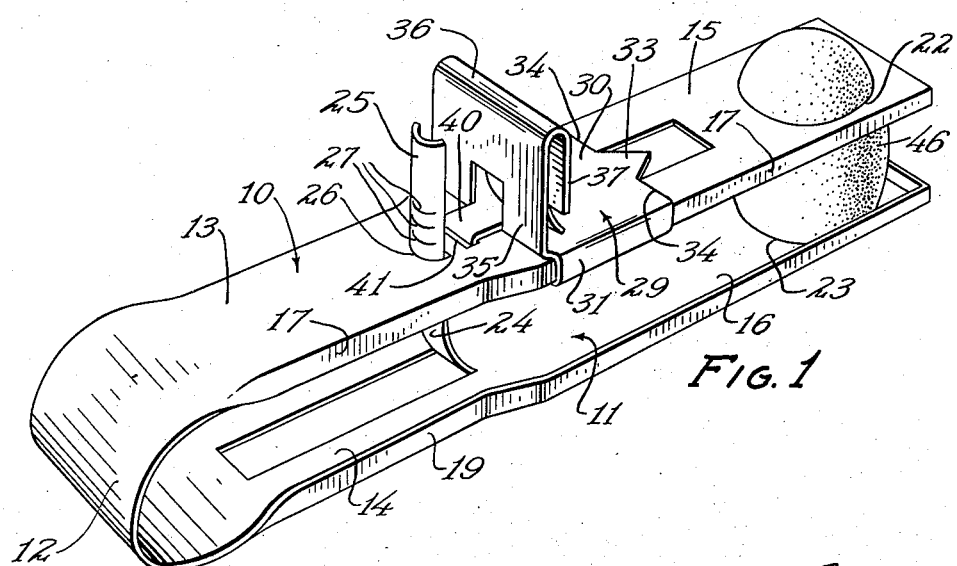
Figure 1 is a perspective view of an egg opener, showing my new construction.

In general, the egg opener includes an elongated strip of spring metal or the like or may be made of a resilient plastic material. It includes a pair of arms indicated in general by the numerals 10 and 11 which are connected by a spring connecting loop 12. The arms 10 and 11 preferably include slightly narrower portions 13 and 14 adjoining the connecting loop 12 and slightly wider arm ends 15 and 16, respectively.

A marginal flange 17 extends along the sides of the narrower portion 13 and wider portion 15 of the arm 10 and a similar marginal flange 19 extends along each side edge of the portions 14 and 16 of the arm 11. An inwardly turned end flange 20 is provided at the extremity of the arm 10 and a similar opposed inwardly turned flange 21 is provided on the end of the arm 11. The flanges 17, 19, 20 and 21 act to stiffen the straight portions of the arms 10 and 11 so that these arms will not bend intermediate the ends and all of the flexing between the arms will take place at the loop 12.

Figure 2:
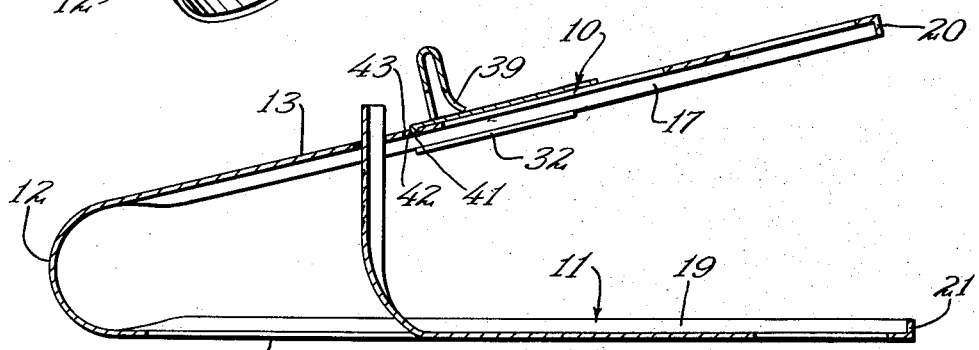
Figure 2 is a side elevational view in section of the opener in open position, the section being taken along the longitudinal center line of the egg opener.

As indicated in Figure 2 of the drawings, the arms 10 and 11 normally diverge apart and the free ends of the arms are spread apart a distance slightly greater than the length of the largest egg to be handled. As a result, an egg may be grasped between the ends of the arms by moving the arm ends on opposite sides of the egg and pressing the arms together to grasp the egg therebetween.

An aperture 22 is provided in the arm 10 near the free end thereof and a similar opposed aperture 23 is provided in the arm 11. These apertures 22 and 23 are somewhat smaller in diameter than the smallest egg to be grasped, the egg being engaged with its longer axis substantially normal to the planes of the arms 10 and 11. Usually the egg is positioned with its largest radius end projecting through the aperture 22 as this is the end of the egg which contains the air sack. This however is obviously at the discretion of the operator.

A strip 24 is cut from the body of the arm 11 preferably in the narrower portion 14 thereof intermediate the longitudinal flanges 19. The strip 24 is bent into substantially right angular relation with the arm 11 and the extremity of this arm is formed into trough or channel shape so as to stiffen the straight portion of the arm. This curved construction will be readily obvious from the drawings and extends through the upper straight portion 25 of the arm 24. The portion of this strip adjoining its connection with the arm 11 is left flat in section and this portion of the arm provides a spring force tending to urge the straight portion 25 of the strip toward the connecting handle loop 12.

The straight portion 25 of the strip extends through an aperture 26 in the arm 10 and the rear surface of the arm is provided with spaced notches or teeth 27 designed to engage against the portion of the handle 10 adjoining the aperture 26. The arm is resiliently urged in this direction by the resiliency of the strip so that as the two arms are moved together the teeth automatically engage the arm 10 and tend to hold the arms from separation. The teeth are shaped so as not to interfere with the movement of the arms toward one another but latch to prevent the separation of these arms.

A removable blade element 29 is slidably supported upon the arm 10 for movement longitudinally of the arm. This slidable blade member includes a plate 30 overlying the upper surface of the arm 10 and a pair of side flanges 31 which extend down over the sides of the flanges 17 of this arm. The flanges 31 are provided with inturned marginal flanges 32 at their lower extremity, the flanges 32 locking beneath the lower edges of the flanges 17 so as to hold the plate 30 in substantial surface contact with the arm 10. The plate 30 is provided with an integral blade element 33 which may be of any suitable shape or design. In the particular construction illustrated, the blade includes the generally triangularly extending projection 33 as well as laterally extending sharpened edges 34 on opposite sides of the central projection.

An upwardly extending flange or shoulder 35 is integral with the rear edge of the plate 30. In the form of construction illustrated, the flange or shoulder 35 is connected at its upper extremity to a looped portion 36 which is attached to a parallel flange 37 extending in parallel spaced relation to the flange or shoulder 35. A centrally located tongue 39 is provided at the lower end of the flange 37 and bears against the upper surface of the plate 30 at a point spaced from the flange or shoulder 35.

Figure 3:
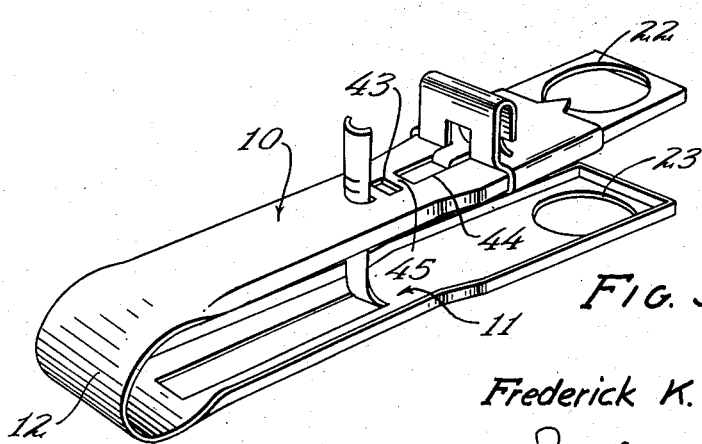
Figure 3 is a perspective view on a reduced scale of the opener in an intermediate position of the blade.

An arm 40 is cut from the body of the flange or shoulder 35 and extends rearwardly in the plane of the plate 30. This arm 40 is provided at its rear end with a down turned lip 41 which may be provided with an inclined rear edge 42 as indicated in Figure 2 of the drawings. As is best indicated in Figure 3 of the drawings, the arm 10 is provided with a generally rectangular aperture 43 midway between the flanged sides 17 and an elongated slot 44 in longitudinal alignment with the aperture 43. The arm 40 with its lip 41 combined with the apertures 43 and 44 provide a detent and detent latch which are an important feature of the present invention.

The arm 40 is sufficiently resilient to be disengaged from the apertures 43 and 44 under certain conditions of operation. Movement of the slidable blade member 29 in a reverse direction toward the loop end 12 may cause the inclined edge 42 of the downturned lip 41 to be disengaged from the elongated slot 44 and to pass over the narrow connecting portion 45 between the aperture 43 and the slot 44.

The operation of the apparatus is simple. The egg 46 is engaged between the arms 10 and 11 with the ends of the egg projecting through the apertures 22 and 23. During this operation, the slidable blade member 29 is in retracted position as indicated in Figures 1 and 2 of the drawings. When in this position, the downturned lip 41 engages in the aperture 43 and holds the slidable blade member from longitudinal movement.

When it is desired to open the egg, the shoulder 35 and its parallel flange 37 are grasped, these portions forming a handle by means of which the slidable blade member may be moved. Force is applied to the shoulder 35 in a direction to move the slidable blade member toward the egg. Movement is resisted by engagement of the lip 41 in the aperture 43. However, when sufficient force is exerted against the shoulder 35, this shoulder tends to bend forward slightly raising the arm 40 which forms the detent latch until it becomes disengaged from the aperture 43. As a result, the slidable blade member is suddenly released for movement and the force against the shoulder 35 is sufficient to quickly move this blade member longitudinally of the arm 10 until the blade severs the upwardly projecting portion of the egg 46. Outward movement of the blade member is limited by the engagement of the detent latch 40 in the elongated slot 44.

After the egg has been opened, the blade member 29 may be moved rearwardly to its normal position illustrated in Figures 1 and 2. By exerting a slight forward pressure on the arm portion 25 the teeth 27 are disengaged from the arm 10, permitting the arm 10 to swing back into the position shown in Figure 2 of the drawings and releasing the egg.

The detent latch is of importance as it insures a swift movement of the blade once the blade member is released for movement. As the pressure necessary to disengage the detent latch may be predetermined, the blade member will always be released when a certain pressure is applied to the shoulder and the speed of movement will be substantially constant.

In accordance with the patent statutes, I have described the principles of construction and operation of my improvement in egg opener, and while I have endeavored to set forth the best embodiment thereof, I desire to have it understood that changes may be made within the scope of the following claims without departing from the spirit of my invention.

I claim:

1. An egg opener including a pair of resiliently connected arms between which an egg may be engaged, one of said arms including an opening near an end thereof through which a portion of the egg engaged may extend, a slidable blade member freely slidably supported upon said one arm, said member having inturned marginal flanges engaging said one arm to constrain said member to movement in a reciprocal path closely parallel to said one arm, a shoulder extending upwardly from said blade member by means of which the blade member may be grasped and moved, a resilient latch arm on said slidable blade member and projecting rearwardly therefrom, the free end of said latch arm having a down-turned lip, a pair of spaced apertures in said one arm in which the free end of said latch arm may engage, said shoulder and latch arm being sufficiently resilient so that a predetermined pressure against said shoulder to move said slidable blade member toward said one end of said one arm will disengage the free end of said latch arm from the aperture in which it is engaged and permit movement of said slidable blade member toward said opening to sever the top of an egg projecting through said opening, the predetermined pressure being substantially greater than that required to slide the blade member when disengaged.

2. The construction described in claim 1 and in which the free end of said latch arm is engageable in the second of said apertures to limit slidable movement of said slidable blade member in one direction.

3. An egg opener including a pair of resiliently connected arms between which an egg may be engaged, one of said arms including an opening through which a portion of the egg may project, a slidable blade member freely slidably supported on said one arm and movable through the portion of the egg projecting through said opening, a handle on said blade member by means of which the blade member may be grasped and moved, a latch arm on said slidable blade member, shoulder means on said one arm with which said latch arm is yieldably engageable when said blade member is spaced from said opening, said latch arm being sufficiently resilient to flex out of engagement with said shoulder means when a predetermined force is exerted on said handle in a direction toward said opening, said predetermined force being substantially greater than that required to slide said blade member through the top of an egg projecting through said opening once said latch arm is disengaged from said shoulder means, whereby when said predetermined force is applied to said handle in a direction toward said opening, said blade means will suddenly release and quickly slide across said opening.

References Cited in the file of this patent

UNITED STATES PATENTS 2,696,860     Jepson _____ Dec. 14, 1954

FOREIGN PATENTS 20,068     Great Britain _____ Jan. 28, 1909